Dec. 25, 1951      B. KERVARREC      2,579,929
MOTOR PLANT FOR CARGO BOATS AND LIKE SEA BOATS
Filed July 25, 1945      2 SHEETS—SHEET 1
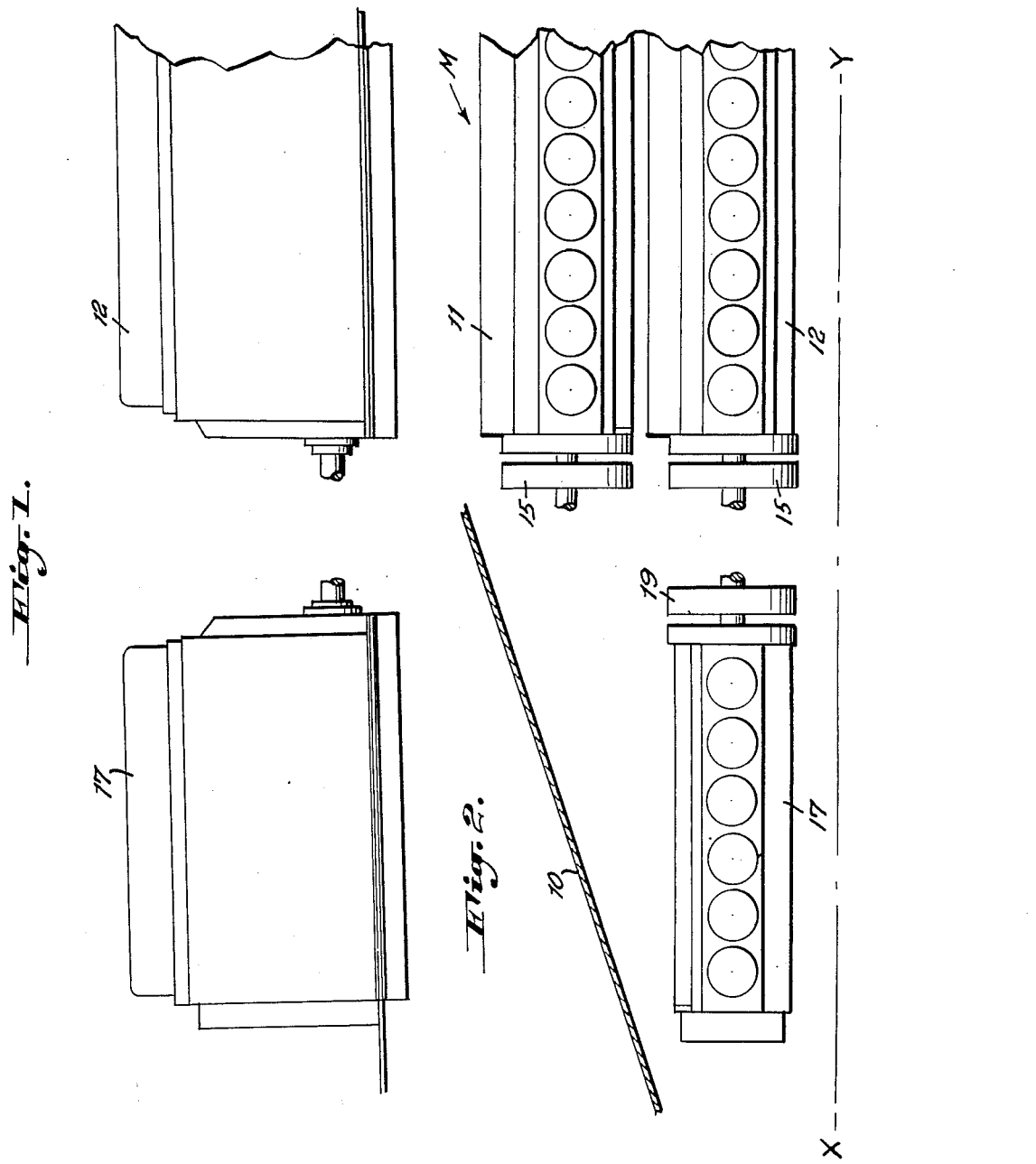
INVENTOR.
Bernard Kervarrec
BY

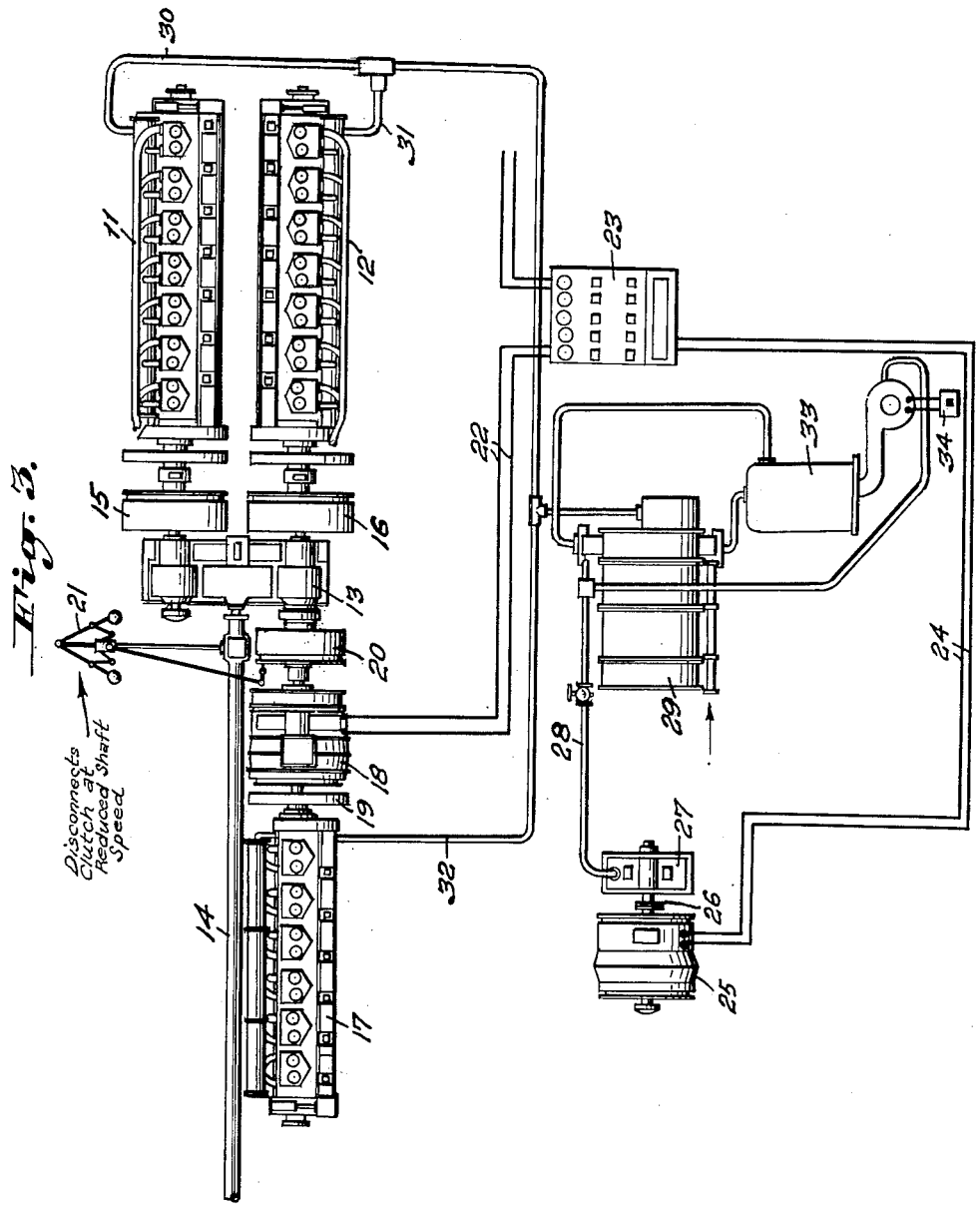

Patented Dec. 25, 1951

2,579,929

UNITED STATES PATENT OFFICE 2,579,929

MOTOR PLANT FOR CARGO BOATS AND LIKE SEA BOATS

Bernard Kervarrec, Paris, France

Application July 25, 1945, Serial No. 607,044
In France September 17, 1942

Section 1, Public Law 690, August 8, 1946
Patent expires September 17, 1962

3 Claims. (Cl. 290—4)

The present invention relates to propulsion means for marine vessels, and more particularly has reference to propulsion means finding particular application in vessels of the cargo type, although it is to be understood that the principles thereof may be used in conjunction with other kinds of ships.

In cargo ships, the power plant utilized is of the horsepower required to handle the working conditions usually present on the ship under consideration. In emergency cases, it is often necessary to provide an additional power source and in the power installation in most vessels all of the main or propelling engines are operatively connected with the propeller shaft whereby the normal operation at a reduced speed is achieved with insufficiently loaded engines, thus resulting in excessive consumption of fuel per horsepower.

Furthermore, aside from the power required to drive the propelling shaft or shafts, cargo ships also carry rather powerful engines for developing electric, hydraulic, or other type energy for operating the winches for loading and unloading the ship when the ship is at anchor. Consequently, the employment of such engines is relatively limited, and in addition to the expense involved, the engines consume considerable space which otherwise could be used for the storage of cargo. Since these auxiliary engines operate under higher speed conditions than the main or propelling engines, they differ structurally and thus require different replacement parts, etc. This means that the ship must carry additional skilled hands and consequently adds materially to the cost of operating the ship which is not desirable from the economic standpoint.

To overcome the foregoing and other disadvantageous characteristics present in the art is an important object of this invention.

A further object of the invention is to provide propulsion means for vessels wherein an auxiliary engine, and a dynamo electric machine operatively connected therewith are capable of being selectively coupled with the propeller shaft driven by the main engines to either impart power to the propeller shaft or provide electrical energy for driving equipment on the vessel, such as refrigerating apparatus, winches and the like.

A further object of the invention is to provide a propulsion system for vessels of the character described wherein the means operatively connecting the dynamo electric machine with the propeller shaft includes a clutch and an automatically responsive device for disconnecting the clutch and as a consequence the dynamo electric machine from the propeller shaft as soon as the speed of the propeller shaft falls to a predetermined value.

To accomplish the above and other objects, the invention broadly comprises a propeller shaft, at least one main prime mover, a speed reducing gear assembly controlled by the prime mover, clutch means operatively connecting the prime mover with the speed reducing gear assembly, an auxiliary prime mover, a starting generating dynamo, clutch means connecting the dynamo with the auxiliary prime mover, additional clutch means directly operatively connecting the dynamo with the speed reducing gear assembly, and an automatically actuated device functioning to disconnect the clutch between the dynamo and the speed reducing gear assembly when the speed of the propeller shaft drops below a predetermined value. More specifically, the propulsion means further includes a generator for feeding the dynamo when the dynamo is operating as an engine, a steam engine driving the generator, a boiler for furnishing steam to the steam engine, and means to heat the boiler.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Fig. 1 diagrammatically shows in longitudinal elevation a preferred form of propulsion means for carrying out the inventive concept.

Fig. 2 is a diagrammatic plan view of Fig. 1, showing only the port group of engines.

Fig. 3 is a diagrammatic view illustrating the essential features of the propulsion means.

Referring to Figure 2, a ship hull of suitable type is denoted 10 and two symmetrical groups of engines M are located on the port and starboard sides of the longitudinal axis X—Y of the ship. For the purpose of simplicity, the drawings and description are limited to the engines on the port side, it being understood that corresponding parts are present on the starboard side. Each group of engines include two main or propelling engines 11—12 of a suitable horsepower, the engines being arranged in parallelism forwardly of a speed reducing gear assembly 13 keyed to a propeller shaft 14. The engines 11 and 12 are respectively coupled to the speed reducing gear assembly by means of clutches 15 and 16, respectively, the clutches being either hydraulic, electro-magnetic, or any other conventional type.

An auxiliary engine 17 of the necessary horsepower is located on the other or rearward side of the speed reducing gear assembly 13 and, as shown in Figure 3, the auxiliary engine is in substantial longitudinal alinement with the engine 12. The engine 17 is similar in structural detail to the main engines 11 and 12, although it possesses a lesser number of cylinders. For example, the main engines may each include eight cylinders, preferably in line, whereby each engine may develop 1600 horsepower or 3200 horsepower for each shaft 14. On the other hand, the auxiliary engine may have six cylinders for developing 100 horsepower. It will be appreciated, therefore, by having the main and auxiliary engines of similar design, the same replacement parts may be employed, thus making maintenance and repair of the respective engines much easier, as well as materially reducing the operating costs.

A dynamo electric machine 18 is located intermediate the auxiliary engine 17 and the speed reducing assembly 13, the dynamo being coupled to the engine 17 by a clutch 19 of any conventional type to permit the dynamo to be connected to or disconnected from the engine 17. A clutch 20 either hydraulic, electro-magnetic or the like is adapted to operatively connect either the engine 17 or the dynamo 18 with the shaft 14 through the speed reducing gear 13, and a centrifugal governor or other automatically responsive unit 21 is associated with the clutch 20 to disengage the auxiliary engine 17 when the speed of the shaft 14 falls below a predetermined value such as 60 to 70 per cent of its normal number of revolutions.

Consequently, if additional motive power is required for the propeller shaft 14, the auxiliary engine automatically cuts in to supply such power, yet when the main engines are capable of moving the vessel at its normal speed, the engine 17 will be disconnected from the propeller shaft through the clutch 20 and its centrifugal governor 21.

The dynamo is connected by leads 22 to a distributing board 23 which, in turn, is coupled by conductors 24 to an electric generator 25. The generator 25 is keyed to shaft 26 of a steam engine 27 of any conventional type. Steam is fed to the engine 27 through suitable conduits 28 leading from a boiler 29. The boiler 29 is heated preferably by the gases which emanate from the main engines 11 and 12 and also the auxiliary engine 17, the gases flowing through conduits 30, 31 and 32, respectively. The steam produced by the boiler is of sufficient temperature and pressure either to be completely or partially used, dependent, of course, upon the ship's requirements, and the current generated by the generator 25 may be transmitted throughout the ship's electrical network through the distributing board 23.

In connection with the exhaust boiler 29 which produces steam for generating electricity in generator 25, there are instances where operation of the vessel will affect the exhaust gas output of the engine. This would be particularly true in maneuvering where the variations in engine speeds would cause a variation in the electrical output of generator 25 due to fluctuation of the temperature and pressure conditions of exhaust heat boiler 29. Therefore, to maintain the electrical output of generator 25 within certain limits, there is provided an auxiliary oil fired boiler 33 shown diagramatically in Figure 3. A suitable automatic control, diagramatically illustrated at 34 is provided to control the output of boiler 33 whenever the output of boiler 29 is insufficient. The control is such that under normal conditions where output is adequate, the temperature and pressure conditions are the same as in main boiler and when the temperature and pressure conditions in the boiler drop below required minimum the output of the auxiliary boiler is increased. Thus, the two boilers are operative to provide a steam output sufficient to maintain proper functioning of the steam operated generator. As shown in the drawing, boiler 33, which is of a conventional type, is connected to the header of the main boiler and the automatic control is responsive to the output of the main boiler. Obviously, any other structural relationship operative to accomplish the booster effect of the auxiliary boiler may be employed.

In view of the electric current that is required on ships, it is possible to employ two collectors for each dynamo, a single collector being used at sea with the brushes of the other collector raised to minimize wear and tear of the collectors.

It can be seen that when the auxiliary engine 17 is not coupled with the propeller shaft 14, the engine is driving the dynamo 18, thus producing electrical energy for the various pieces of equipment on the vessel. In the event the electrical energy is unnecessary, the dynamo may be disconnected from the auxiliary engine by operating the clutch 19 to disconnect the respective members.

Hence, it can be seen that I have provided a propulsion means for marine vessels wherein an auxiliary engine or engines will be automatically coupled to the propeller shaft or shafts when an excessive load has been placed on the main engines whereby the vessel is enabled to maintain its normal operating speed. When the speed of the propeller shaft has been reduced to a predetermined value, the auxiliary engine is uncoupled from the propeller shaft whereupon the auxiliary engine is utilized to drive the dynamo for providing electrical service for the auxiliary equipment of the vessel.

It is thus possible by having the main and auxiliary engines of the same basic design to use the same replacement parts, thus saving considerable expense and storage space on the vessel, and furthermore, the employment of heavy auxiliary engines for driving the ship equipment, such as winches, refrigerating machines and the like is eliminated, which reduces in no small measure the operating costs of the vessel.

What I claim is:

1. In a power system for ships and the like vehicles, the combination of a propelling shaft, a prime mover, a speed reducing gear controlled by the latter, a clutch operatively connecting the prime mover with the speed reducing gear, a second prime mover, a starting generating dynamo, a clutch operatively connecting said dynamo with said second prime mover and means directly and operatively connecting the dynamo with the speed reducing gear and including a clutch and means for disconnecting said clutch as soon as the speed of the shaft drops underneath a predetermined value.

2. In a power system for ships and the like vehicles, the combination of a propelling shaft, a prime mover, a speed reducing gear controlled by the latter, a clutch operatively connecting the prime mover with the speed reducing gear, a second prime mover, a starting generating dynamo, a clutch operatively connecting said dynamo with said second prime mover, and means directly and mechanically connecting the dynamo with the speed reducing gear and including a clutch and means for disconnecting said clutch as soon as the speed of the shaft drops underneath a predetermined value, an electric generator adapted to feed the dynamo when the latter operates as a motor, a steam engine adapted to drive said electric generator and a boiler fired by the exhaust gases from the two first prime movers and adapted to feed steam to the steam engine.

3. In a power system for ships and the like vehicles, the combination of a propelling shaft, a prime mover, a speed reducing gear controlled by the latter, a clutch operatively connecting the prime mover with the speed reducing gear, a second prime mover, a starting generating dynamo including two commutators and means for feeding selectively current from said commutators for auxiliary purposes, a clutch operatively connecting said dynamo with said second prime mover and means directly and operatively connecting the dynamo with the speed reducing gear and including a clutch and means for disconnecting said clutch as soon as the speed of the shaft drops underneath a predetermined value.

BERNARD KERVARREC.

REFERENCES CITED

The following references are of record in the file of this patent:

UNITED STATES PATENTS

| Number | Name | Date |
|---|---|---|
| 832,622 | Del Proposto | Oct. 9, 1906 |
| 992,780 | Kitchen | May 23, 1911 |
| 1,481,829 | Chorlton et al. | Jan. 29, 1924 |
| 1,594,383 | Ruths et al. | Aug. 3, 1926 |
| 1,768,530 | Short | June 24, 1930 |
| 1,801,133 | Beekman | Apr. 14, 1931 |
| 1,910,368 | Schoeni | May 22, 1933 |
| 1,926,849 | Gray | Sept. 12, 1933 |
| 2,181,741 | Rosch | Nov. 28, 1939 |
| 2,263,202 | Wood | Nov. 18, 1941 |
| 2,343,265 | Price | Mar. 7, 1944 |
| 2,419,807 | Wilcox | Apr. 29, 1947 |
| 2,419,810 | Beall | Apr. 29, 1947 |
| 2,419,811 | Beall | Apr. 29, 1947 |

FOREIGN PATENTS

| Number | Country | Date |
|---|---|---|
| 165,701 | Switzerland | Feb. 1, 1934 |
| 213,156 | Great Britain | Mar. 27, 1924 |
| 516,582 | Great Britain | Jan. 5, 1940 |

OTHER REFERENCES

Ser. No. 330,189, Giljam (A. P. C.) pub. Apr. 27, 1943.